United States Patent Office 3,554,989
Patented Jan. 12, 1971

3,554,989
MODIFIED HALOGEN CONTAINING POLYMERS
Walter Stamm, Tarrytown, N.Y., assignor to Stauffer Chemical Company, New York, N.Y., a corporation of Delaware
No Drawing. Continuation-in-part of application Ser. No. 608,751, Jan. 12, 1967, now Patent No. 3,461,091, dated Aug. 12, 1969, which is a continuation-in-part of abandoned application Ser. No. 586,045, Oct. 12, 1966. This application Nov. 29, 1968, Ser. No. 780,164
Int. Cl. C08f 27/06
U.S. Cl. 260—79.5      4 Claims

ABSTRACT OF THE DISCLOSURE

A novel modified polymer is produced through the reaction of a thio acid or thio anhydride and a chlorine containing polymer. The thio modifying agent is employed in amounts in excess of 10% and the reaction is conducted at temperatures in excess of the temperature at which hydrogen halide is formed from the polymer.

---

This application is a continuation-in-part application based upon co-pending patent application, Ser. No. 608,751, filed on Jan. 12, 1967 which issued on Aug. 12, 1969, as U.S. Pat. No. 3,461,091, which was a continuation-in-part of Ser. No. 586,045, filed on Oct. 12, 1966, now abandoned, and co-pending continuation-in-part application, Ser. No. 760,699, filed on Sept. 18, 1968, entitled "Poly(thiol anhydrides)".

The present invention relates to novel, thermally stable polymers based upon halogen containing polymers. More particularly, this invention relates to novel polymers prepared through the modification of halogen containing polymers.

In co-pending applications, Ser. Nos. 608,751 and 760,699, it is taught that halogen containing polymers can be heat stabilized through the incorporation of a stabilizing amount of a thiol acid, a thiol acid salt or a thiol anhydride. This stabilization has proved most effective. It has now been found, however, that a new type of polymer or copolymer can be obtained through the modification of a halogenated polymer. This modification involves the reaction of relatively large amounts of carboxylic thiol anhydrides or thiol acids and a halogen containing resin. The modified polymers produced are colorless, clear, essentially odorless and thermally very stable. It is known that the thiol anhydrides decompose giving color at relatively low temperatures. For example, thiollauric anhydride turns yellow at a temperature of about 250° F. within one minute. It is also known that polyvinyl chloride resin, as typical of the halogen containing polymers, also become colored after exposure to a temperature of about 250° F. and higher, if it is not heat stabilized. The novel resins of this invention are thermally stable at temperatures of 360° F. and higher and remain clear and colorless with little or no odor.

While the resins of this invention can be employed in any of the uses of conventional resins, they find particular utility in the production of plastic bottles and films.

In accordance with the present invention, a novel, thermoplastic resin is provided through the reaction of a halogen containing polymer and from about 10 to about 50 parts by weight per 100 parts of chlorine-containing polymer of a thiol anhydride or thiol acid, containing the moiety:

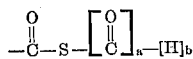

wherein $a$ and $b$ are integers having values of from 0 to 1 inclusive such that $a$ and $b$ always equals 1. The reaction is conducted at a temperature at which hydrogen halide is formed from the halogen containing polymer.

Illustrative of the thio modifying agents encompassed by the formula above are:

The mono basic thio acids of the formula

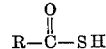

The poly basic thio acids as represented by the formula

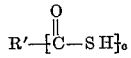

The mono thioanhydrides of the formula

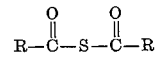

and the polymeric thio anhydrides of the formula

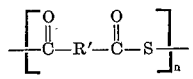

wherein R in the formulas above is a monovalent essentially hydrocarbon group consisting essentially of hydrogen and carbon.

By the term essentially hydrocarbon group consisting essentially of hydrogen and carbon is intended that other such inert substituents or elements may be present as do not change the basic character of the material. For example, ether (—O—) and thio ether (—S—) groups can be present in the essentially hydrocarbon group without changing its character.

Illustrative of the monovalent essentially hydrocarbon groups represented by R above are the alkyl groups containing from about one to about 20 carbon atoms inclusive such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl and the like; the cycloalkyl groups containing from about 1 to about 20 carbon atoms inclusive such as cyclopropyl, cyclobutyl, cyclohexyl, cyclopropyl ethyl, cyclophentyl propyl, cyclohexyldecl, methyl cyclohexyl and the like; and the aromatic groups containing from about six to about 20 carbon atoms inclusive such as phenyl diphenylphenylene, tolyl, xylyl, tert-butylphenyl, nonyl phenyl and the like.

R' in the formulas above is a polyvalent essentially hydrocarbon group consisting essentially of hydrogen and carbon as defined above. The valency of R is generally from about 2 to about 6 inclusive and is preferably 2.

For purposes of convenience, the hydrocarbon base will be employed for purposes of illustration understanding of course that this base has the valency indicated above where possible. Accordingly, illustrative of the polyvalent hydrocarbon groups represented by R' above are the polyvalent alkanes containing from about 1 to about 20 carbon atoms such as methane, ethane, propane, butane, pentane, hexane, heptane, octane, nonane, decane, undecane, dodecane, tridecane tetradecane pentadecane, hexadecane, heptadecane, octadecane, nonadecane and the like; the polyvalent cycloaliphatic hydrocarbons containing from about 3 to about 20 carbon atoms such as represented by the hydrocarbons cyclopropane, cyclobutane, cyclopentane, cyclohexane, butyl cyclohexane, dodecyl cyclohexane, ethyl cyclohexane and the like; the polyvalent aromatic hydrocarbons such as are represented by the hydrocarbons benzene, biphenyl, diphenyl propane, toluene xylene and the like.

In particular respect to the aliphatic groups as represented by R and R' above, it should be noted that these groups can contain olefinic unsaturation although this has little effect upon the modifying agent.

In the formulas above $c$ is the degree of polyvalency of R and has a value of from 2 to 6 and $n$ is a number representing the repeating units in the molecule. $n$ generally has a value of from about 3 to about 1000 and preferably 25 to about 100.

It is preferred that R and R' above be aliphatic and contain from about 9 to about 16 carbon atoms inclusive.

Representative of specific thiol anhydrides and thiol acids for use in accordance with the present invention include thiolacetic anhydride, thiolacetic acid, thiolcaproic anhydride, thiolenanthiac anhydride, thiolcaprylic anhydride, thiolpelargonic anhydride, thiolcapric anhydride, thiolundecanoic anhydride, thiollauric anhydride, thiollauric acid, thioltridecanoic anhydride, thiolmyristic anhydride, thiolpentanedecanoic anhydride, thiolpalmitic anhydride, thiolmargaric anhydride, thiolcarboxylic anhydride analogs of so-called neo-acids, thiolstearic anhydride, thiolstearic acid, thiolnonadecanoic anhydride, thiolarachidic anhydride and thiolheneicosanoic anhydride, thiolnaphthenic anhydride, thiolbenzoic anhydride, phenylthiolacetic acid anhydride, methylthiolbenzoic anhydride, tolylthiolacetic acid anhydride, naphthalenethiolcarboxylic anhydride, thiolphthalic anhydride and the like. Compounds containing the same number of carbon atoms as those set forth above but which have unsaturated bonds present, e.g., undecylenic, oleic, thiolcrotonic acid anhydrides and the like, are likewise suitable although not preferred in the present invention. Most preferred thiol anhydrides are thiollauric anhydride, thiolstearic anhydride, thiolpalmitic anhydride, and the like. This preference is predicated upon the easy availability of precursors for these compounds, i.e., the fatty acids which can be derived from natural products.

The following compounds are illustrative of the essentially hydrocarbon moieties containing an occasional and infrequent inert substituent other than hydrogen and carbon: alpha-hydroxythiolstearic anhydride, 9,10-dihydroxythiolstearic anhydride, zinc 11-aminothiolundecanoic anhydride, nitrothiolbenzoic anhydride and chlorothiolbenzoic anhydride.

By the term "halogen containing polymer" is intended any polymer containing a halogen such as iodine, bromine, chlorine and fluorine. In this respect, however, it is most preferred to employ chlorine containing polymers as the halogen moiety, as these compounds are readily available and comparatively inexpensive. It is, of course, to be understood that this term is intended to include both homopolymers as well as copolymers, as, for example, produced from vinyl chloride and vinylidene chloride monomers, as well as mixtures and blends of homopolymers and copolymers with other vinyl homopolymers or copolymers, although the only reactive sites in respect to this invention are the halogen sites on the particular monomer or polymer employed in the copolymer or homopolymer, respectively.

The term 'halovinyl polymers" employed herein is intended to mean a polymer produced from a monomeric material of the type:

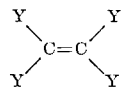

wherein 1 or more Y represents halogen, preferably chlorine, which will be used as illustrative hereinafter, but also including bromine, fluorine and iodine, covalently bonded to a carbon and the remaining Y or Y's represent a hydrocarbon residue or hydrogen. It is to be understood, of course, that post-halogenated polymers such as hydrocarbon polymers chlorinated after polymerization, i.e., chlorinated polyethylene, chlorinated polypropylene, can serve equally as well in the present invention. Representative copolymeric compositions in which the stabilizer compounds of the present invention are useful include copolymers of vinyl chloride or vinylidene chloride with themselves or with other copolymerizable vinyl monomers. Such copolymerizable vinyl monomers generally contain from about 2 to about 16 carbon atoms, inclusive, and can be illustrated by the following: lower α-olefin monomers such as ethylene, propylene, butene, and the like; the aromatic vinyl monomers such as styrene, α-methyl styrene, chlorostyrene, and the like; vinyl and vinylidene halides such as vinyl chloride, vinyl fluoride, vinylidene chloride, vinylidene bromide, and the like; vinyl esters such as vinyl formate, vinyl acetate, vinyl propionate, vinyl butyrate, vinyl chloroacetate, vinylchloropropionate, and the like; acrylic and alpha-alkyl acrylic acids, their amides, and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-di-methylacrylamide, methacrylamide, N-methyl methacrylamide, N,N-dimethylmethacrylamide, acrylonitrile, chloroacrylonitrile, methacrylonitrile, ethacrylonitrile, and the like; maleic and fumaric acids, and their esters such as dimethyl maleate, diethyl maleate, monobutyl maleate and the like; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone, and the like; N-methyl-N-vinyl acetamide, N-vinyl carbazole, N-vinylpyrrolidone, ethyl methylene malonate and the like.

Particularly suitable copolymers for use in the present invention include vinyl chloride/vinyl acetate copolymer, vinyl chloride/acrylonitrile copolymer, vinyl chloride/acrylic acid copolymer, and the like. It is, of course, understood that the only reactive portions of such copolymers are the polymerized monomeric units containing halogen, and for this reason, the copolymers should contain a predominant amount of halogen containing monomer polymerized therein. It is preferred in the conduct of this invention to employ vinyl chloride homopolymer. It is, of course, further understood that the weight amounts of the reactant thiol anhydrides or thiol acids employed are based upon the presence of the chlorine monomer polymerized in the polymer.

The preferred polymers for use in this invention are the vinyl chloride homopolymers.

It will be appreciated that the modified polymers of the present invention can be used to blend with other conventional copolymers or homopolymers, if desired.

Thiol anhydrides useful in the present invention can be prepared in accordance with procedures well known in the literature as demonstrated in Illustrations 1, 2 and 3 below:

ILLUSTRATION 1

Thiolstearic anhydride

To 2.0 grams (0.066 mole) of thiolstearic acid in 50 milliliters of carbon tetrachloride are added 2.1 grams (0.069 mole) of stearoyl chloride and ten drops of pyridine at 40°–50° C. After one hour, pyridine hydrochloride is removed by filtration, and the filtrate is evaporated to dryness. The resultant solid (5.3 grams; M.P. 76°–79° C.) is recrystallized from heptane; M.P. 78°–79° C.; yield practically quantitative. The compound has a sharp band in the I.R. at 5.75μ and analyzes correctly.

ILLUSTRATION 2

Preparation of thiolbenzoic anhydride

In 300 milliliters of hot water was dissolved 140 grams of 60% aqueous sodium sulfide. To this solution were added three grams of a commercial wetting agent* and 90 grams of disodium acid phosphate hydrate as buffer. After cooling the mixture to 0° C., 280 grams of benzoyl chloride were added with continued stirring of the mixture. The batch temperature was kept below 15° C. throughout. Thiolbenzoic anhydride was filtered from the reaction mixture, washed with cold water and dried under vacuum at 35° C. The product had a melting point of 47-49° C. and was recovered in 96% yield.

ILLUSTRATION 3

Preparation of thiollauric anhydride

In a reaction flash provided with a stirrer, dropping funnel and an efficient cold water condenser were dissolved 21.6 grams (0.1 mole) of thiollauric acid in 50 milliliters of benzene. A constant stream of dry nitrogen was sparged through the agitated solution which was warmed up to 60° C. Then 22 grams of distilled lauroyl chloride were slowly added to the reactor through the dropping funnel. The addition was completed in about 30 minutes, and the reaction was brought to completion by stirring the mixture for about four hours at reflux temperature. A small amount of pentane (about 20 milliliters) was then added to the solution which was cooled down to room temperature. Thiollauric anhydride crystallized out in good yield and high purity. Melting point 52°-54° C.

Preparation of the polymers of the present invention comprises heating the precursor, halogen containing thermoplastic polymer, in the presence of the thiol anhydride or acid to be reacted therewith. While this reaction will lend itself to many types of equipment and process such as solution reaction or high pressure reaction in an autoclave, it has been found most desirable to react the materials on such equipment as both provide heat and mastication. Illustrative of such equipment is the two-roll or three-roll mill, the Banbury mixer, the Henschel mixer, the Ko-Neader, or various types of extruders, although the present reaction is not limited to such equipment. If, however, the thio modifying agent employed is volatile below the reaction temperature, suitable pressure equipment must be employed.

As indicated above, it is preferred to employ from about 10 to about 50 parts by weight of the thiol anhydride per 100 parts by weight of the halogen containing polymer. It will be appreciated that this amount is based upon the chlorine or halogen present in the polymer and in the event a copolymer is employed wherein only a percentage of the monomer contains a halogen, then the thiol anhydride is based upon that percentage. It is preferred to employ from about 10 to about 35 parts thiol anhydride per 100 parts of halogen containing resin.

The temperature at which the reaction is conducted should be below the boiling point of the thiol anhydride or thiol acid and yet at the temperature at which labile halogen groups are released from the halogen containing resin. In respect to the thiol anhydride, the boiling points are generally above the initiation of dehydrohalogenation of the resin, except in the lower molecular weight thiol anhydrides. In the case of the lower molecule weight thiol anhydrides and acids suitable pressure equipment such as an autoclave must be employed. Various expedients can be employed such as conducting the reaction under pressure, if it is desired to use these lower boiling anhydrides or thiol acids at temperatures in excess of their boiling points or through the employment of other techniques well known and understood in the art. In the case of vinyl chloride homopolymers, the initial dehydrohalogenation temperature is generally from about 200° to about 300° F. Accordingly, a temperature of from about 200° to about 400° F. can be employed. However, most carboxylic thiolanhydrides themselves are relatively un-

*Aerosol AT trademark of American Cyanamid.

stable at these temperatures. Monomeric, linear-aliphatic thiolanhydrides develop color at about 250° F.; branched-aliphatic thiolanhydrides develop color at about 265° F.; most polymeric thiolanhydrides develop color only at 300° F., or higher. Therefore, to avoid color formation in the reaction between thiolanhydrides and chlorinated polymers, it is desirable to increase the reaction temperature gradually. For instance, in the reaction between thiollauric anhydride and a polyvinyl chloride homopolymer of medium viscosity, the initial mastication temperature is preferably 220°-280° F. After 30-60 minutes, the temperature can be raised to 300°-380° F. to complete the reaction without development of color.

While applicant does not intend to be bound by theory, it is believed that the modification of the halogen containing resin is effected by the removal of hydrogen halide from the halogen containing polymer and the subsequent substitution of sites having lost labile halogen with thiol ester, ester and keto substituents. This is believed to be effected by the fracture of the anhydride group to form a corresponding thiol ester radical and a corresponding keto radical which serve to replace the halogen and/or hydrogen displaced from the polymer, and accordingly, present a much more stable polymer as modified.

It will also be appreciated that the "thiolanhydride modified" polymers prepared in accordance with the present invention can contain other additives in their ultimate formulation. For example, they can contain ultra-violet light stabilizers, anti-oxidants, colorants such as dyes and pigments, as well as various fillers. They can also be used with external plasticizers such as dioctyl phthalate and tricresyl phosphate. When employed with a blend of other polymers such as vinyl chloride homopolymer, then, of course, it may be necessary to stabilize the other polymer and accordingly, a thermal stabilizer may be necessary for the composition, although as indicated above, the polymer of the present invention requires no additional thermal stabilization.

In the example which follows and throughout the specification, all parts and percentages unless otherwise indicated are by weight.

EXAMPLE 100 parts of a powdered polyvinyl chloride homopolymer resin (Stauffer SCC-616) were thoroughly dry blended with 15 parts of thiollauric anhydride. This blend was brought onto a chrome-plated two-roll mill at 280° F. Slowly the powder turned to a semi-fluid mass and within 15 minutes to a coherent viscous film. After 30 minutes milling time at 300° F., the mill temperature was raised slowly to 360° F. and kept at 360° F. for an additional 30 minutes. After a total milling time of about 2 hours (280°-360° F.) a film was removed from the mill which was fairly stiff, impact resistant, and entirely colorless. The IR spectrum of the film revealed very little residual thiollauric anhydride but did indicate the presence of thiolester groups in the polymer. The new polymer was characterized by outstanding thermal stability.

In the manner set forth in the example above, modified polymers can also be prepared by reacting thiol anhydrides such as thiollauric anhydride, or thiol acids, with chlorinated polystyrene, chlorinated polyethylene and polyvinylidene chloride.

What is claimed is:

1. The process of preparing a modified vinyl chloride polymer by reacting said vinyl chloride polymer with a thiol anhydride of the formula:

$$\underset{\|}{\text{R}-\text{C}}-\text{S}-\underset{\|}{\text{C}}-\text{R}$$
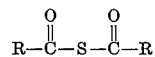

wherein R is an alkyl group containing from about 9 to about 16 carbon atoms, inclusive, at a temperature of from about 200° to about 400° F., wherein the said thiol anhydride is present in an amount of from about 10 to about 35 parts per 100 parts polymer.

2. The product formed by the process of claim 1.
3. The process of claim 1 wherein said thiol anhydride is thiollauric anhydride.
4. The product formed by the process of claim 2.

References Cited

UNITED STATES PATENTS

| | | | |
|---|---|---|---|
| 2,378,535 | 6/1945 | Brubaker | 260—79.7 |
| 2,666,752 | 1/1954 | Grummitt | 260—23 |
| 3,156,649 | 11/1964 | Hewett | 252—48.6 |
| 3,260,736 | 7/1966 | Martin | 260—455 |
| 3,342,790 | 9/1967 | De Vries | 260—79.5 |

JOSEPH L. SCHOFER, Primary Examiner

C. A. HENDERSON, Jr., Assistant Examiner

U.S. Cl. X.R.

260—23, 79, 87.1, 87.5, 87.7, 91.5, 92.8, 93.5, 455, 775, 884, 899

PO-1050
(5/69)

UNITED STATES PATENT OFFICE
CERTIFICATE OF CORRECTION

Patent No. 3,554,989     Dated January 12, 1971

Inventor(s) Walter Stamm

It is certified that error appears in the above-identified patent and that said Letters Patent are hereby corrected as shown below:

Column 7, Claim 4 to read as follows:

4. The product formed by the process of Claim 3.

Signed and sealed this 4th day of May 1971.

(SEAL)
Attest:

EDWARD M. FLETCHER, JR.
Attesting Officer

WILLIAM E. SCHUYL
Commissioner of P